April 27, 1965  R. B. STANLEY ETAL  3,180,478
APPARATUS FOR PRODUCTION PACKAGING OF AEROSOL PRODUCTS
Filed Dec. 12, 1960  8 Sheets-Sheet 1

INVENTOR.
RICHARD B. STANLEY
ROY S. ROUSSEAU
BY
Cromwell, Greist & Warden
ATTORNEYS INVENTORS
RICHARD B. STANLEY
ROY S. ROUSSEAU
BY
Cromwell, Greist & Warden
ATTORNEYS April 27, 1965 R. B. STANLEY ETAL 3,180,478
APPARATUS FOR PRODUCTION PACKAGING OF AEROSOL PRODUCTS
Filed Dec. 12, 1960 8 Sheets-Sheet 3

INVENTORS
RICHARD B. STANLEY
BY ROY S. ROUSSEAU

ATTORNEYS

April 27, 1965     R. B. STANLEY ETAL     3,180,478
APPARATUS FOR PRODUCTION PACKAGING OF AEROSOL PRODUCTS
Filed Dec. 12, 1960     8 Sheets-Sheet 4

*INVENTORS*
RICHARD B. STANLEY
BY ROY S. ROUSSEAU

ATTORNEYS

April 27, 1965 R. B. STANLEY ETAL 3,180,478
APPARATUS FOR PRODUCTION PACKAGING OF AEROSOL PRODUCTS
Filed Dec. 12, 1960 8 Sheets-Sheet 5

*INVENTORS*
RICHARD B. STANLEY
ROY S. ROUSSEAU
BY
Cromwell, Greist & Warden
ATTORNEYS United States Patent Office 3,180,478
Patented Apr. 27, 1965

1

3,180,478
APPARATUS FOR PRODUCTION PACKAGING
OF AEROSOL PRODUCTS
Richard B. Stanley, Park Ridge, and Roy S. Rousseau,
La Grange Park, Ill., assignors to The Kartridg Pak Co.,
Mount Prospect, Ill., a corporation of Iowa
Filed Dec. 12, 1960, Ser. No. 75,414
3 Claims. (Cl. 198—34)

This application is a continuation-in-part of our copending application, Serial No. 497,196, filed March 28, 1955, now Patent No. 2,963,834, the disclosure of which, to the extent it is not inconsistent herewith, is specifically incorporated by reference.

This invention relates to an improved method and apparatus for production packaging of aerosol products and more particularly relates to pressure filling a metered quantity of propellant into a container by holding the closure cap above the container while filling the same with propellant and thereafter sealing the cap to the charged container.

The invention offers important advantages over the known technique of pressure filling propellant through the valve of a closure cap that has previously been sealed to the container. In the present invention, the speed of fill is no longer restricted because of the small size of the valve passage; the space requirements of the production line are reduced by consolidating the separate functions of filling and sealing into a single apparatus; the increased filling rate permits of handling larger containers and greater volumes of fill; and the possibility of valve damage is eliminated and valves already equipped with tips may be used thereby eliminating the labor cost of manual placement of the valve tips on the valves.

Similarly, the invention offers important advantages over the other well known technique of cold filling propellant (in liquid phase) into the container and thereafter applying and sealing the closure cap. In the present invention, the accuracy of metered volumetric filling is a marked improvement over the timed gravity flow technique used in cold filling. The need for equipment for refrigerating the product and the propellant is eliminated and correspondingly the high initial cost as well as the operating and maintenance costs for such equipment is eliminated; and the loss of time and the labor cost involved in change-overs of refrigerated products and in cleaning of lengthy refrigerator coils is eliminated. Accordingly, the principal object of the present invention is the provision of an improved method and apparatus offering the above named advantages in production line application to the pressure filling of metered quantities of liquid propellant into containers and to the mounting and sealing of closure caps on the filled containers at a single station.

Another object of the invention is the provision of an arrangement of the above type utilizing a rotary table having a plurality of operating stations each equipped with facilities for first filling and thereafter sealing aerosol containers.

Still another object of the invention is the provision of an improved operating station arrangement having separate crimping and pressure filling heads controlled in predetermined timed relation to act in sequence for carrying out the required filling and sealing functions.

An additional object is the provision of a universal head directly engageable with the container for elevating the closure cap thereon, evacuating vapors, air or gas from the container, feeding the propellant into the container under pressure, seating the closure cap and finally sealing the cap to the container.

Another object is the provision of a pressure filler head for supplying accurately metered quantities of propellant for delivery in liquid form, through the universal head and into the container.

A still further object relates to a novel rotary seal facility provided on the rotary table for controlling the parting of the supply lines for the universal and pressure filler heads.

A further object of the invention is the provision, at the operating station, of reciprocating post units mounted in the rotary table for driving the operating heads, the posts having special antifriction facilities for maintaining desired alignment thereof and each post having a follower engagement in a separate barrel cam track for timing its motion.

Still a further object of the invention relates to the provision of a "no can—no fill" control feature for holding the pressure filling head inoperative until a container is in proper position at its operating station.

Another object of the invention is the provision of an adjustable feed screw alongside a main conveyor for controlling the speed and spacing of containers to insure smooth transfer thereof to the rotary table.

Still another object of the invention is the provision of novel guide rails for association with star wheels in controlling the transfer of containers between the main conveyor and the rotary table.

Other objects and advantages of the invention will become apparent during the course of the following description.

In the accompanying drawings forming a part of this specification and in which like numerals are employed to designate like parts throughout the same.

*General arrangement and operation*

Figures 1, 3:
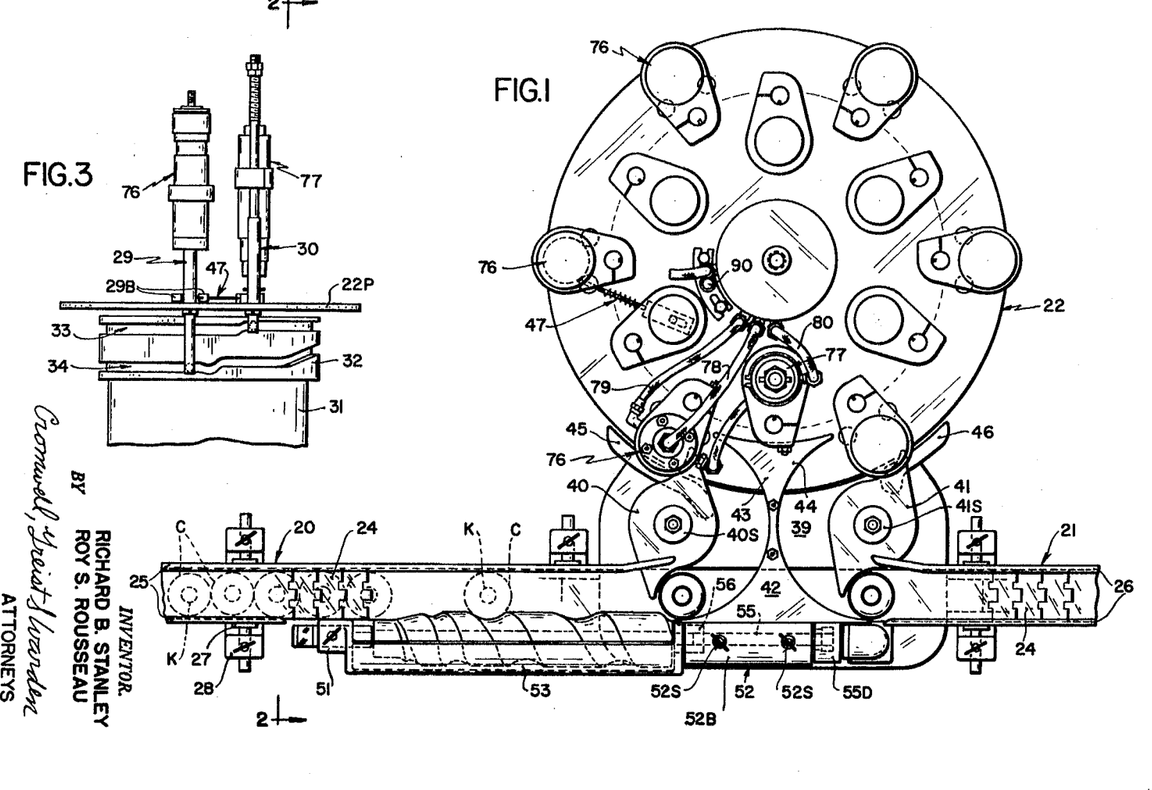
FIG. 1 is a top plan view illustrating the overall conveyor and turntable arrangement of the aerosol production packaging apparatus of this invention.
FIG. 3 is a fragmentary side elevational view of a typical operating station on the turntable.
Figures 2, 4, 5, 6:
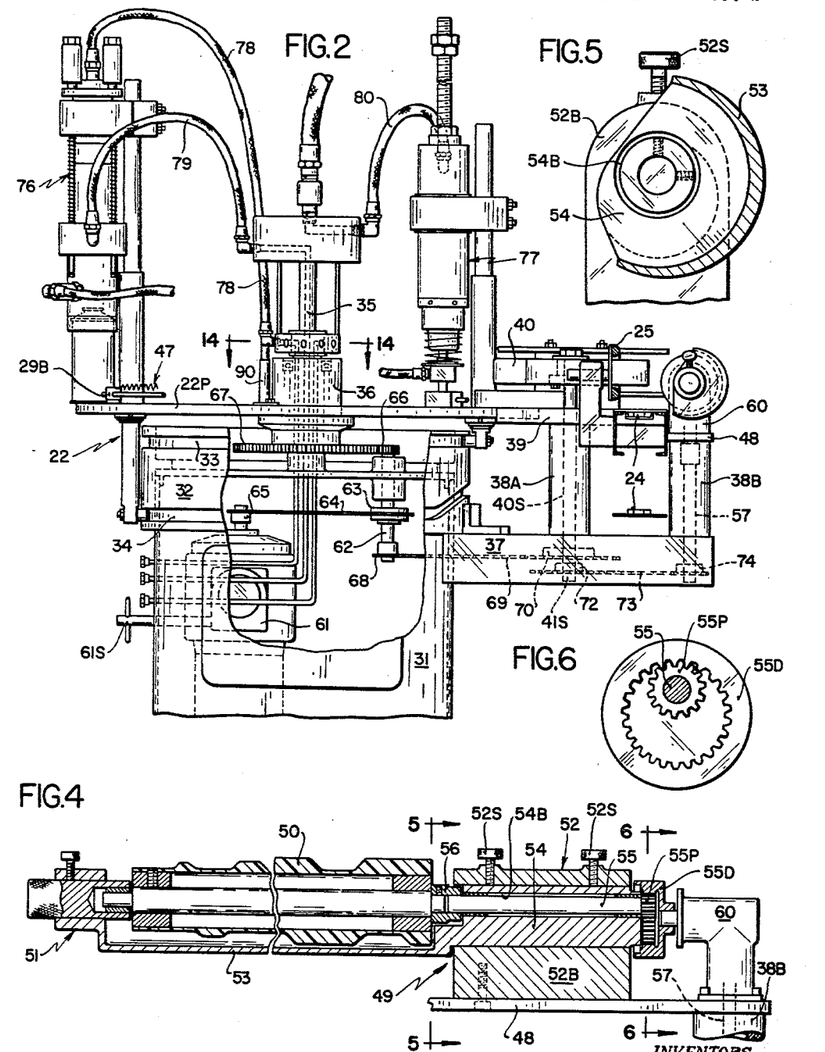
FIG. 2 is a side elevational view and is taken approximately on the line 2—2 of FIG. 1.
FIG. 4 is a vertical sectional view through the conveyor feed screw mechanism.
FIGS. 5 and 6 are detailed sectional views taken on the lines 5—5 and 6—6, respectively of FIG. 4.

The production line apparatus for filling and sealing aerosol containers is shown in its entirety in FIGS. 1 and 2 and as illustrated therein for purposes of disclosure, it includes a main conveyor line having an infeed section 20 and an outfeed section 21, with a turntable 22 interposed between the sections to form a rotary link that consolidates the filling and sealing operations and provides increased processing time for the containers that are handled on the main conveyor line.

Figure 7:
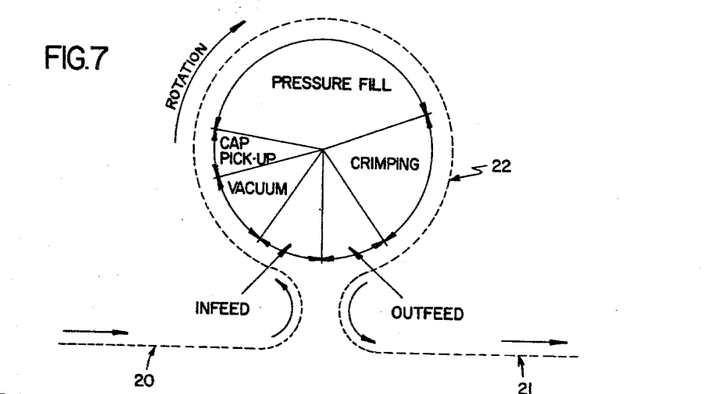
FIG. 7 is a diagrammatic illustration of the container flow path and processing sequence embodied in the production packaging apparatus.
Figure 8A:
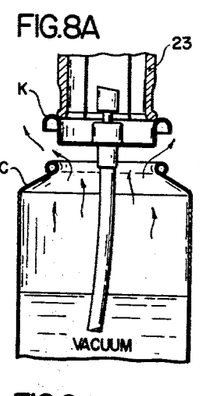
FIGS. 8A, 8B, 8C and 8D are diagrammatic pictorial views illustrating the various operations performed in filling and sealing a container.
Figure 8B:
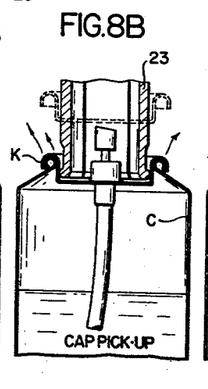
Figure 8C:
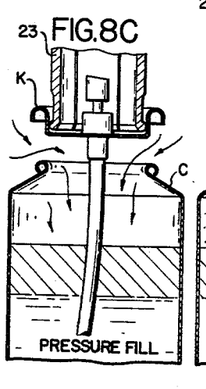
Figure 8D:
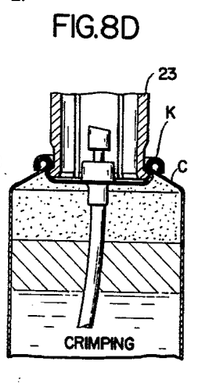
Figure 9:
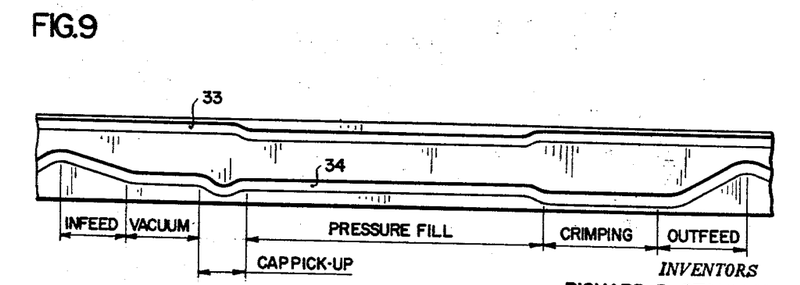
FIG. 9 is a timing chart picturing the relative relationships of the inner related cam tracks on the turntable.

For purposes of general description, reference should be had to the container flow diagram in FIG. 7 wherein the infeed and outfeed sections are shown leading up to and away from the generally circular path of the rotary link. The circular path is divided into arcuate sub-sections to indicate the sequential operations that are performed upon the containers as they are moved through this rotary link. The various operations are depicted in FIG. 8, and a timing chart of the controlling cam track configurations is illustrated in FIG. 9 and is referred to hereinafter to better relate the sequence of operations that are performed by the present apparatus.

In the arrangement illustrated for purposes of disclosure, each of the containers C on the infeed section of the conveyor has already been filled with the desired product and a closure or valve cap K is seated loosely in the top of each container. As will be apparent, the conveyor line moves continuously and the turntable 22 rotates continuously. As indicated on the diagram of FIG. 7, during the first segment of the turntable's rotary motion, an infeed operation is carried out wherein the container is transferred from the infeed section 20 onto the turntable and is accurately located at one of the operating stations provided on the turntable. During the next segment of the turntable's rotation, as diagrammed in FIG. 7 and as illustrated in FIG. 8A, a vacuum is drawn across the top of the container to elevate the closure K and exhaust the air from the container. During the next segment of the turntable's rotation, and as indicated in FIG. 8B, the vacuum is maintained while a collet 23 is lowered into mechanical gripping engagement within the closure. In order for the collet to mechanically engage and pick up the closure, it moves downwardly to seat the closure momentarily within the top of the container and thereafter, as indicated in FIG. 8C, the collet is retracted upwardly to elevate the closure sufficiently to provide clearance around the sides and bottom of the closure for filling pressurized liquid propellant into the open top of the container. The operation which is shown in FIG. 8C occupies a 100° segment of the turntable's rotation, as indicated in FIG. 7. After the propellant-filling step is completed, the collet is then lowered to seat the closure in the top of the container and is then expanded to seal the closure across the container and complete the packaging operation. The final segment of the rotational movement of the turntable is devoted to the discharge of the container, which is then transferred to the outfeed section 21 of the conveyor line to feed the filled and pressurized container through various associated equipment, such as hot water test tanks, labeling machines, and the like.

*Container handling apparatus*

Figures 10, 11, 12:
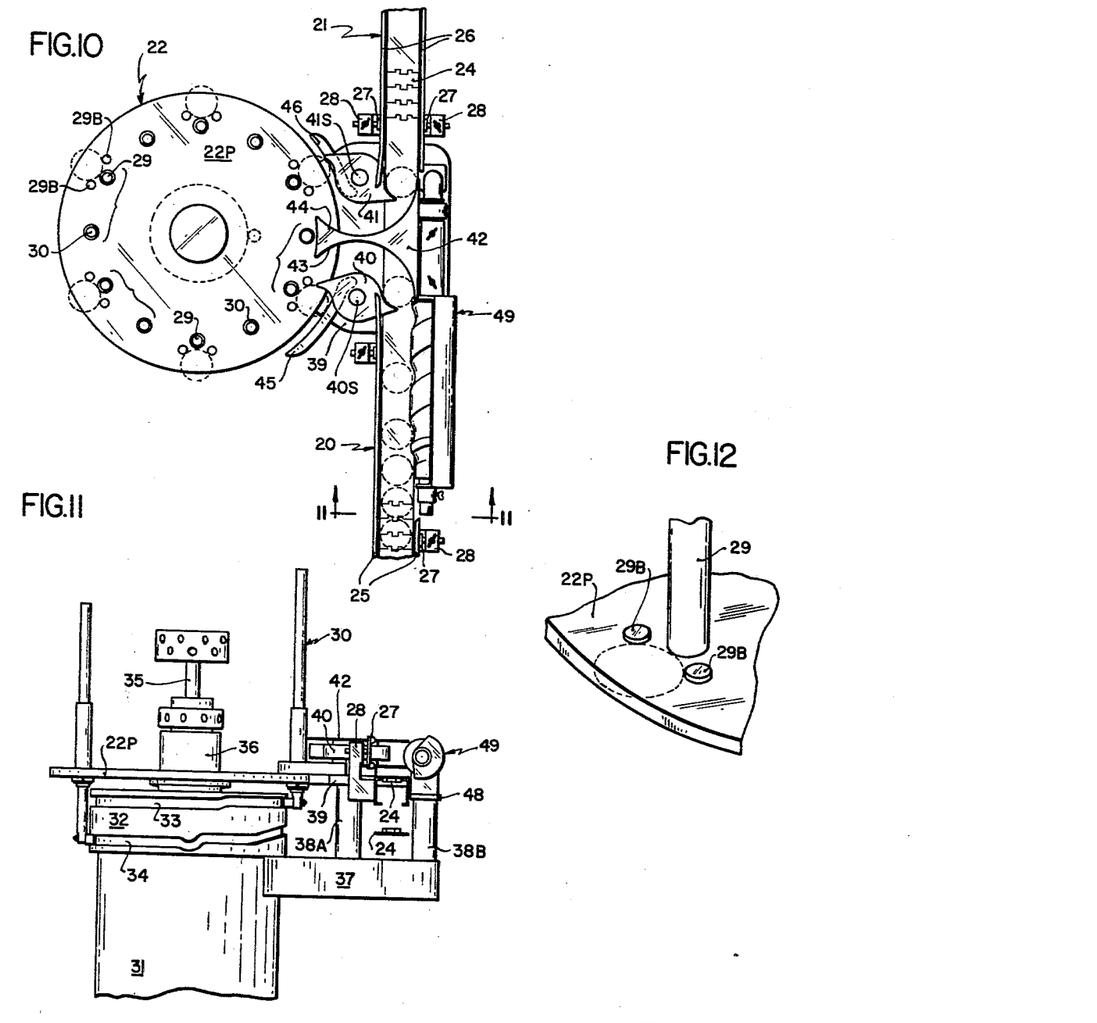
FIG. 10 is a fragmentary plan view of the conveyor and turntable illustrating the layout of the operating stations in relation to the container feeding and transferring apparatus.
FIG. 11 is a fragmentary side elevational view of the conveyor and turntable better illustrating certain details thereof.
FIG. 12 is a fragmentary perspective view of the dial plate of the turntable.

The basic arrangement of the conveyor line, the transfer apparatus, and the turntable are shown in FIGS. 10, 11 and 12, which better illustrate the physical details of construction of the complete apparatus that is shown in FIGS. 1 and 2. The conveyor is represented as having a single endless table top type link chain 24 with a pair of guide rails 25 being disposed in flanking relation along the infeed section of this conveyor chain and a separate pair of guide rails 26 being similarly disposed along the outfeed section of this chain. The guide rails of each section are carried on laterally adjustable mounting posts 27 which are slidable in mounting blocks 28 to accommodate adjustment in the spacing of the rails in conformity with the size of the containers that are being handled.

As indicated in FIG. 10, the turntable 22 includes a rotatable dial plate 22P which, in the arrangement illustrated herein for purposes of disclosure, is provided with six evenly spaced pairs of vertically reciprocable post assemblies 29 and 30 which index or define six operating stations on the the dial plate. The post assembly 29 of each station has a set of locating buttons 29B (FIG. 12) associated with it to define a mounting niche for receiving and accurately locating the container that is to be processed at the particular operating station.

The turntable comprises a cylindrical base drum 31, a barrel cam in the form of a skirt 32 encircling the upper end of the drum and provided with endless cam tracks 33 and 34, respectively, a center post 35 mounted in and extending above the drum, and a rotating hub 36 journalled about the center post. The dial plate 22P is secured around the bottom end of the hub and is of sufficient size to project beyond the barrel cam skirt, with the operating post assemblies 29 and 30 being located in a ring or circle on a diameter slightly greater than the diameter of the barrel cam skirt.

The base drum 31 also carries an outboard support housing 37 that is fitted with a set of four upstanding tubular posts arranged in inner and outer pairs 38A and 38B, respectively. The innermost pair of posts 38A carries a transfer plate 39 that is disposed at the same elevation as are the dial plate and the main conveyor surface. Infeed and outfeed star wheels 40 and 41, respectively, are carried on spindles 40S and 41S (see FIG. 2) journalled in the inner pair of posts. The transfer plate 39 is fitted with guide structure 42 arranged midway between the star wheels to define crescent-shaped infeed and outfeed transfer rails 43 and 44, respectively. The transfer plate is also equipped with a tangent guide rail 45 at the infeed to the turntable, this guide rail being positioned and shaped to assist the star wheel 40 in accurately delivering the container to the proper position in one of the mounting niches defined by the buttons 31. Finally, on the discharge side, the transfer plate is fitted with another tangent guide rail 46 that maintains the container in proper position on the turntable for pick-up by the outfeed star wheel.

As is explained in detail hereinafter, a separate spring-loaded mechanism, such as is indicated generally at 47 in FIGS. 1 and 2, is associated with each container-mounting niche to continuously urge the containers away from their proper seated position defined by the locating buttons 29B. During most of the circular travel of each container on the turntable, it is mechanically gripped and held in place by a head mechanism carried on the post 29. In order, however, to initially seat the container against its locating buttons in the presence of the opposing spring forces, the infeed tangent guide rail 45 constrains the container to move into and remain in properly seated position to permit the head mechanism to establish proper engagement therewith. Correspondingly, the outfeed tangent guide rail 46 restrains the container following its release by the feed mechanism at the approach to the outfeed star wheel 41.

The outermost pair of support posts 38B (FIGS. 2 and 4) are bridged by a reinforcement plate 48 on one end of which a variable pitch worm screw type container accelerating mechanism 49 is mounted in position for feeding containers from the consolidated relationship in which they are fed along the infeed section 20 of the conveyor to deliver the containers individually and in predetermined timed relationship to facilitate their transfer to the turntable by the infeed star wheel 40. The star wheel 40 is synchronized with the turntable so that the containers are delivered to the successive operating stations in properly timed relationship.

The container feed worm element 50 has its opposite ends journalled in aligned bearings 51 and 52 provided in a generally semi-cylindrical protective shell or housing 53. At one end this shell 53 is fitted with an integral support journal 54 which is rotatably adjustable in an elongated bearing block 52B to support the shell in cantilever fashion. Hand screws 52S in the bearing block press against the journal 54 to fix the shell at any desired rotational position therein. The support journal 54 has a lengthwise extending off-center bore 54B in which a rotatable worm drive rod 55 is mounted. A sleeve-type coupling 56 connects the drive rod 55 to the worm 50, and a set screw is provided in this coupling to accommodate adjustment of the rotational position of the worm with respect to its drive rod. The other end of the drive rod 55 is fitted with a pinion gear 55P (FIG. 6) which is engaged internally within a cup-shaped drive gear 55D, with the pinion gear undergoing planetary motion with respect to the drive gear.

The drive gear 55D is coaxial with the journal 55, and the off-center relationship between the drive gear and pinion gear permits a range of adjustment in the lateral position of the worm gear 50, the adjustment being accomplished merely by temporarily loosening the hand screws 52S and rotating the mounting shell 53 for the worm. As the mounting shell rotates, the axis of rotation of the worm is shifted through a circular path and the parts are arranged to utilize a predominantly horizontally extending arcuate segment of this path.

The drive for the worm gear includes a spindle 57 journalled in one of the outermost posts 38B and drivingly connected into miter gears mounted within a right-angled gear box 60.

This arrangement not only affords a range of lateral adjustment of the worm position to adapt a single worm to the handling of containers of various sizes, but it also affords a vernier timing adjustment for insuring smooth container handling. In this connection, it is important, for avoiding damage to cans and spillage of their contents, that each can be supplied to the star wheel so that the can and the point of the star wheel that engages the can are moving at approximately the same speed. Both the speed and the time of arrival of a can at the star wheel location may be accurately regulated by adjustment of the lateral position of the worm element.

The driving mechanism for the turntable and its associated container-transfer equipment are housed within the drum base 31 (see FIG. 2) and include a variable speed drive motor 61 having a speed-selector control 61S projecting through the wall of the drum base and a vertical countershaft 62 journalled within the drum base and having an intermediate sprocket 63 connected by a link chain 64 to a drive sprocket 65 mounted on the output shaft of the motor. At its upper end the countershaft 62 carries a small pinion gear 66 that engages a depending ring gear 67 provided on the rotating hub 36 and located within the base drum. At its lower end the countershaft 62 is fitted with a sprocket 68 which is drivingly connected to a link chain 69 that is engaged over separate sprockets 70 provided at the lower end of the star wheel spindles. The spindle 41S for the outfeed star wheel is also fitted with a drive sprocket 72 that engages a link chain 73 to drive a sprocket 74 on the spindle that extends upwardly into the miter box 60 of the worm drive.

This apparatus arrangement lends itself to fabrication into equipment having any desired number of operating stations. In the arrangement illustrated, six operating stations are provided on the dial plate and two-point star wheels 40 and 41 are employed. In an equivalent arrangement, twelve operating stations can be provided on the dial plate, in which case four-point star wheels and a worm element 50 having a shorter discharge pitch are employed. The speed ratio of the driving mechanism would then be changed to speed up the worm element 50 with respect to the star wheels.

*Operating stations*

In each operating station, the sequence of operations depicted in FIGS. 7 and 8 are carried out by the action of a crimper head 76 which is associated directly with the container being processed and a pressure filler head 77 which acts in conjunction with the crimper head to supply propellant to the container. Each operating station is provided with a pressurized hydraulic liquid line 78 for operating the crimper head 76, a vacuum line 79 for connection through the crimper head to evacuate volatile materials from the top of the container and a pressurized propellant delivery line 80 for connection through the pressure filler head to deliver metered quantities of a propellant such as Freon.

Figure 13:
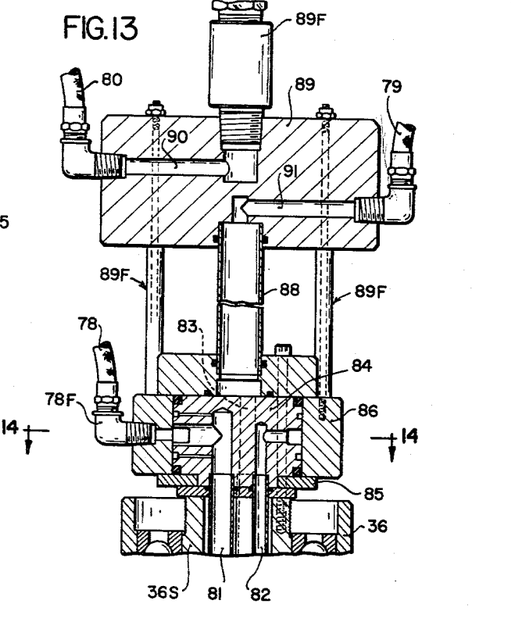
FIG. 13 is a vertical sectional view through the central distributor and rotary seal arrangement of the turntable.
Figure 14:
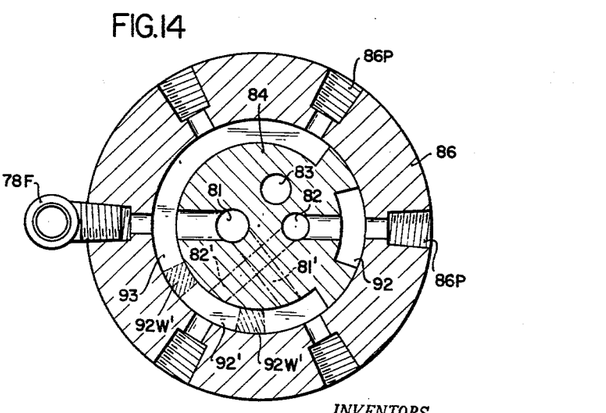
FIG. 14 is an enlarged detailed sectional view taken approximately on the line 14—14 of FIG. 13.
Figure 15:
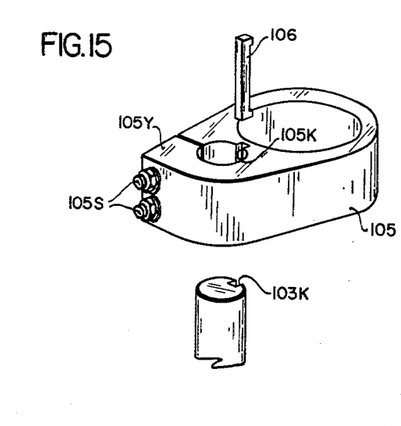
FIG. 15 is an exploded perspective view of an operating post and mounting bracket assembly.
Figure 16:
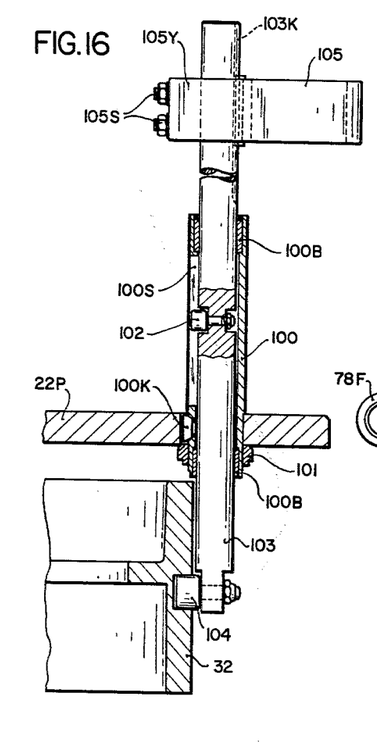
FIG. 16 is a fragmentary vertical sectional view through a recipocating post assembly.
Figures 21, 22, 23:
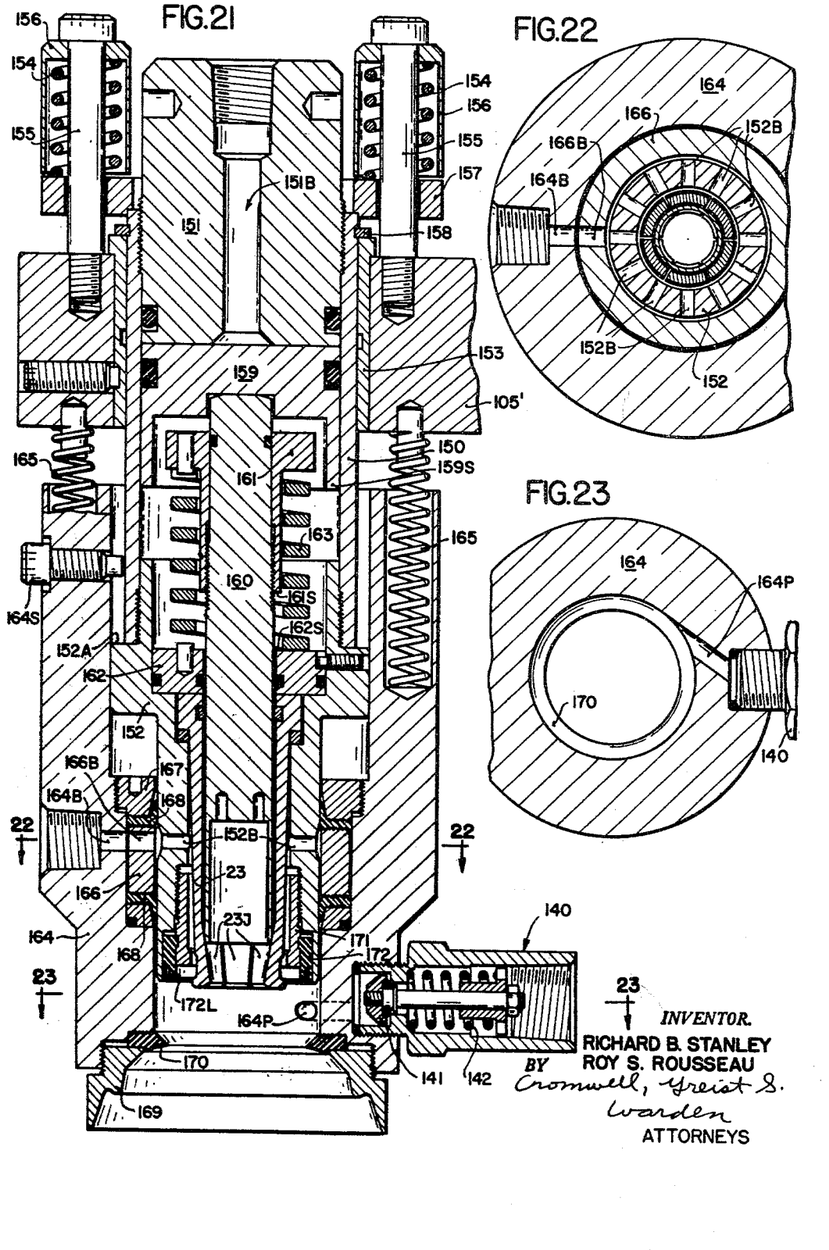
FIG. 21 is a vertical sectional view through a crimper head.
FIG. 22 is a plan sectional view taken on the line 22—22 of FIG. 21.
FIG. 23 is a plan sectional view taken on the line 23—23 of FIG. 21.

These various lines are brought through a central distributor and rotary seal arrangement shown in FIGS. 13 and 14 for separate connection to each operating station. Each operating station also includes two reciprocating post assemblies (see FIG. 3) drivingly controlled by the separate cam tracks provided in the barrel cam skirt 32. At each station, the reciprocating post assembly 29 for operating the crimper head 76 is associated with the lower cam track 34 while reciprocating post assembly 30 for operating the pressure filler head 77 is associated with the upper cam track 33. The construction details for maintaining alignment of the reciprocating posts are shown in FIGS. 15 and 16 while the pressure filler head details are shown in FIGS. 17 to 20 and the crimper head details are shown in FIGS. 21 to 23.

*Central distributor and rotary seal for connecting supply lines to the head units*

The hub 36 which rotates with the dial plate 22P is fitted with a stationary central sleeve 36S (FIG. 13) that houses three vertically extending connection lines 81, 82 and 83. A stationary central valve body 84 is fixed across the upper end of the sleeve 36S with a thrust plate 85 sandwiched therebetween. The valve body 84 has separate vertical bores forming internal passage extensions for the lines 81, 82 and 83. A valve ring 86 encircles the valve body 84 and is rotatable thereabout conjointly with the dial plate 22P. Seal rings 86R seated in the opposite ends of the valve body provide an effective rotating seal against the inner periphery of the valve ring 86.

The valve ring has a separate supply port 86P (FIG. 14) and connection fitting 78F leading to each of the individual hydraulic pressure supply lines 78, with the ports and fittings being spaced equally about the periphery of the ring. A cap 87 is provided across the upper ends of the valve body and valve ring and has a central upstanding tube 88 forming a passage extension for the vacuum line 83 and functioning as a support post for a distributor head 89 that is rotatably mounted on the tube 88 and that is secured to the outer valve ring 86 by a plurality of support and fastener assemblies 89F to rotate the distributor head in unison with the valve ring 86 and the dial plate 22P. The fastener assemblies 89F include tubular vertical columns 89C abutting the opposed faces of the valve ring 86 and the distributor head 89. A rigid drive post 90 (FIGS. 1 and 2) is fixed to the dial plate and extends upwardly to abut against one of the connection fittings 78F for rotating the valve ring with the dial plate 22P.

Propellant under high pressure is connected from a high pressure source of supply through a fitting 89F at the center of the top face of the distributor head 89 and a series of internal radial bores 90 lead to the individual propellant supply lines 80. Similarly, the vacuum line 83 extends through the tube 88 and through the center of the underface of the distributor head to a series of radial bores 91 that communicate with the separate vacuum lines 79. Thus, it will be understood that propellant under pressure is continuously available to each pressure head and vacuum sources are continously connected to each crimper head.

The hydraulic pressure lines 78 are controlled in a predetermined timed relation by means of the rotary valve and seal assembly. Line 82 feeds hydraulic liquid under high pressure from a tank and pump assemblage (not shown) while line 81 forms a low pressure return for draining the hydraulic liquid back to its storage tank. The stationary valve 84 has an inlet port 92 (FIG. 14) about a short portion of its periphery that communicates with the high pressure supply line 82 and has a large drain port 93 about substantially the remainder of its periphery that communicates with the low pressure return line 81.

As the valve ring 86 rotates with the dial plate 22P, each of its ports 86P is successively moved past the high pressure supply port 92 of the stationary ring and during this time, for the arrangement illustrated herein, high pressure is supplied only to the crimper head associated with the particular port involved. The relative position and size of the ports controls the timing of the supply of hydraulic liquid. During substantially the complete remainder of the cycle of rotation of each port of the valve ring, it is in communication with the drain port 93 and return line 81 of the stationary valve.

*Reciprocating posts*

The post assemblies 29 and 30 are of substantially identical construction with the obvious exception that the post for engagement in the lower cam track 34 is somewhat longer. As shown in FIG. 16, each post assembly includes a sleeve 100 that projects through a mounting hole provided in the dial plate 22P. The lower end portion of the sleeve is threaded to receive a lock nut 101 positioned beneath the dial plate. Immediately above this threaded portion, the sleeve is formed to receive a key 100K that seats within a slot bordering the mounting hole for the sleeve. The key and slot predetermine and maintain the circular position of the sleeve with respect to the plate. The sleeve is provided with a vertically extending slot 100S defining a guideway for a roller type follower 102. Internal sleeve bearings 100B are provided at the upper and lower ends of the main sleeve, and a cylindrical post 103 is reciprocable through the mounting sleeve. The post carries a cam roller 104 at its lower end that is engaged in one of the cam tracks in the barrel cam skirt 32 and intermediately of its length, the post is cut out on its opposite sides to provide mounting notches for the cam follower 102 which comprises a stud, a lock nut for one end of the stud, and a roller journalled on the other end of the stud and projecting beyond the post to engage within the guideway 100S of the mounting sleeve. This roller type cam follower arrangement minimizes friction and wear while accurately maintaining the rotational alignment of the post and the main sleeve.

The upper end of the reciprocating post 103 is provided with a vertical keyway 103K, and a head-holding bracket 105 is mounted in telescoping relation thereon. The head-holding bracket has a split mounting yoke portion 105Y encircling the post and fitted with clamping screws 105S to accommodate mounting of this bracket at selected elevations along the reciprocating post. The yoke portion of the bracket is provided with a circular mounting hole bordered by a keyway 105K for register with the keyway 103K in the operating post, and a key element 106 is seated in these keyways to secured the parts together in predetermined alignment.

*Pressure filler head*

The pressure filler head 77, as shown in FIGS. 17 to 20, is associated with a mounting bracket 105 for driving the head by means of the operating post 103 of the reciprocating post assembly 30, which is controlled by the upper cam track 33.

The head includes an actuator body 110 having a depending striker stem 110S for engagement with a sliding block 111 of the spring loaded trigger mechanism designated generally at 47.

In addition to the block 111 which is mounted to slide on the dial plate 22P, the trigger mechanism has a guide rod 112, one end of which projects in slidable relation through a transverse passage provided in one of the locating buttons 29B and the other end of which is fixed in the block 111 by a pin 113 which also serves as an anchor for a tension spring 114. The spring 114 normally acts to draw the block 111 towards the locating button 29B to shift the block to the position in which it is illustrated in FIG. 20.

Figures 17, 18, 19, 20:
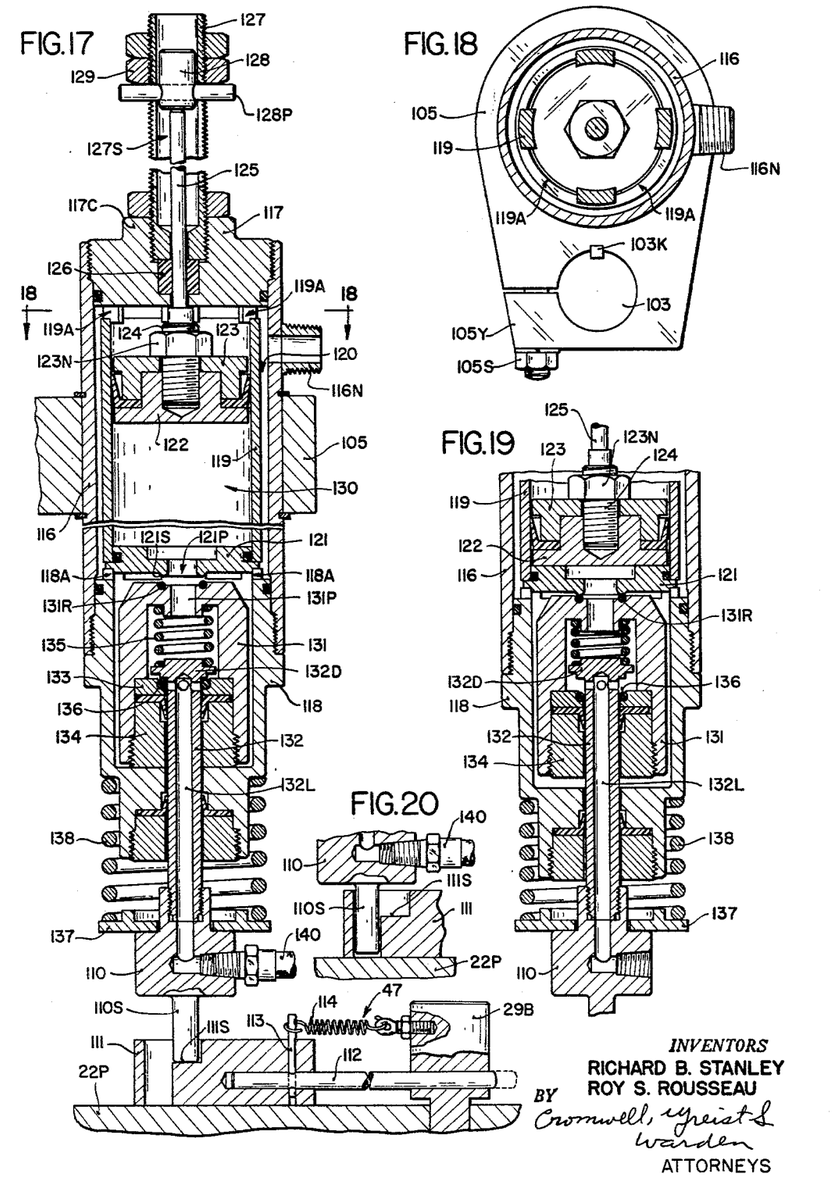
FIG. 17 is a vertical sectional view through a pressure filler head.
FIG. 18 is a plan sectional view taken on the line 18—18 of FIG. 17.
FIG. 19 is a vertical sectional view through the lower end of a pressure filler head illustrating the parts thereof in the position occupied at the end of the discharge stroke.
FIG. 20 is a fragmentary sectional view illustrating the action of a trigger mechanism for controlling discharge of a pressure filler head.

When no container is present in the mounting niche of the operating station, the sliding block is in the position in which it is illustrated in FIG. 20 wherein the full travel of the striker stem 110S is readily accommodated and the vertical downward travel of the reciprocating post assembly 30 for the pressure filler head is ineffective to initiate discharge of propellant. When a container is in proper position, however, the guide rod 112 is displaced to shift the slide block 111 to the position in which it is illustrated in FIG. 17 and in this instance, downward travel of the actuator body 110 is limited when the striker stem 110S seats against the internal step 111S of the slide block. Continued downward travel of the post while the actuator body remains stationary, triggers discharge of propellant from the pressure filler head. This no can—no fill feature eliminates undesired discharge of propellant into the atmosphere.

The presssure filler head has a tubular main housing or casing 116, the upper and lower ends of which are provided with screw threaded end closure plugs 117 and 118, respectively, each of which has an axial passage. A cylinder sleeve 119 is disposed within the main housing in annularly spaced relation thereto and is provided with a set of wall openings 119A adjacent its upper end for establishing communication from the annular space 120, provided between the housing and cylinder sleeve, and the upper end of the cylinder chamber. A stationary seal plate 121 is fittted between the upper end of the closure plug 118 and the lower end of the cylinder 119 and has a central port 121P for establishing communication from the lower end of the cylinder 119 to the annular space 120 through wall openings 118A provided at the upper end of the closure plug 118. The housing 116 is provided with a nipple 116N for convenient attachment with the corresponding propellant supply line 80 which is fed from the distributor head 89 to supply propellant under pressure to the filler head.

A piston 122 of any suitable construction is mounted for liquid tight sliding movement with the cylinder 119 and an externally threaded coupling element 124 is fixed in and projects from the upper end of the piston to receive a lock nut 123N for clamping a ring cap 123 to the piston. The coupling element 124 anchors a piston rod 125 to the piston. The piston rod 125 projects through the upper end closure plug 117 with a seal ring packing 126 being provided to prevent escape of propellant.

The upper end plug 117 includes an internally threaded integral end collar 117C for mounting an upstanding external stainless steel guide tube 127 which is slottted lengthwise as indicated at 127S. The piston rod 125 is slidable lengthwise through the tube 127 and is fixed to a carrier 128 that has a stop pin 128P projecting transversely through the slots 127S for locating engagement with a stop collar 129 on the upper end of the guide tube. Piston travel is controlled by adjusting the position of the stop collar 129 along the guide tube 127.

The space is the cylinder sleeve beneath the lower face of the piston 122 constitutes a metering chamber 130 the capacity of which is regulated by adjustment of the stop collar 129. The lower end of the metering chamber 130 is bounded by the generally disc-shaped stationary seal plate 121, the underneath face of which is provided with an annular valve seat 121S in surrounding relation to its central port 121P which constitutes a discharge opening for the metering chamber.

A valve cage 131 is disposed between the seal plate 121 and the lower end closure plug 118 and has a central passage 131P opening through its upper end in registering relation to the discharge passage 121P and a seal ring 131R is seated in the upper end of the valve cage to establish sealing engagement with the valve seat 121S for blocking off communication between the propellant supply and the metering chamber during propellant discharge.

A movable valve stem 132 having the integral seal disc 132D at its upper end is slidable through the cage and is held in place therein by a valve seat ring 133 which is fixed in abutting engagement against an internal shoulder on the cage by a collar 134 which is threaded in the lower end of the cage. The movable valve stem 132 has a substantially full length lengthwise bore 132L opening axially through its lower end and opening radially at the underface of the seal disc 132D. A coil spring 135 located within the cage normally urges the sealing disc 132D downwardly to the position illustrated in FIG. 17 wherein it engages an O ring 136 mounted in the seat ring 133 to block premature discharge of propellant from the metering chamber.

The actuator body 110 is threaded onto the lower end of the movable valve stem 132 and has an internal passage forming a continuation of the discharge passage that extends through the stem. The actuator body is formed with an upwardly facing marginal external shoulder to receive a spring seat ring 137 for a helical coil spring 138, the upper end of which seats against a downwardly facing external shoulder near the lower end of the closure plug 118.

In FIG. 17 the parts are illustrated in the normal position wherein the metering chamber 130 is fully charged with propellant. However, the reciprocating post assembly 30 for the pressure head unit is at an intermediate point of its vertical stroke as illustrated by the fact that the striker stem 110S has moved down to meet the internal step 111S in the sliding block 111. At the upper end of the stroke of the reciprocating post the striker stem 110S is carried above the sliding block. In the FIG. 17 position, it will be clear that discharge from the metering chamber 130 is blocked by the O-ring 136 between the sealing disc 132D and the seat ring 133. In the FIG. 19 position, on the other hand, the discharge passage is open at this point.

The transmission line 140 for supplying propellant discharged from the pressure head to the crimper head has a check valve 141 (see FIG. 21) at its delivery end. The check valve is physically mounted in the crimper head and is normally held closed by a spring 142 and is adapted to open upon the build up of a predetermined pressure value in the transmission line. The pressure value required for triggering the check valve must be sufficient to ensure that the volatile propellant will be maintained in liquid phase in the transmission line. This check valve relationship is important for maintaining accurate metering which, of course is the principal function of the pressure filler head.

The cycle of operation of the filler head may now be described in relation to FIGS. 17 and 19. In FIG. 17 the movable valve stem 132 is in its lowermost position and the discharge passage therethrough is sealed by the O-ring 136 which is compressed between the sealing disc 132D and the seat ring 133. Moreover, the valve cage 131 is in its lowermost position so that both ends of the cylinder sleeve 119 are in open communication with the source of pressurized propellant. Thus, the liquid pressure acts on opposite faces of the piston 122 and due to the differential areas resulting from the provision of an externally projecting piston rod 125, the force on the underneath face of the piston predominates and the piston moves to its uppermost limit of travel as determined by engagement of the stop pin 128P with the stop collar 129. The piston is moved to this position as a result of the metering chamber 130 being progressively filled with the pressurized propellant supplied from the source.

With a container in proper position in its mounting niche, the sliding block 111 is in the position in which it is shown in FIG. 17 and upon the reciprocating post assembly 30 moving the pressure filler head downwardly the striker stem 110S abuts the internal step 111S of the block and upon continued downward movement of the pressure head unit the movable valve stem 132 undergoes relative upward movement with respect to the outer casing 116. Due to the stiffness of the coil spring 135 housed in the cage 131, the valve cage moves towards the stationary seal plate 121 to establish a seal around the valve seat 121S that encircles its discharge port 121P at the bottom of the metering chamber.

Thereafter, upon continued movement, the cage spring 135 yields and allows the sealing disc 132D to clear the O-ring 136 and complete a discharge passage which then extends from the metering chamber 130 through the port 121P, the center of the valve cage 131 and through the movable valve stem 132 and adapter body 110 to the transmission line 140. It will also be noted that the engagement of the O-ring 131R in the upper face of the cage against the valve seat 121S isolates the bottom end of the metering chamber and its discharge passage from the source of pressurized propellant.

The opening of the discharge passage immediately develops sufficient pressure in the transmission line to open the check valve 141 at the delivery end of the transmission line and allow the liquid in the metering chamber to flow from beneath the piston 122 and through the transmission line 140 and this effects a slight reduction in pressure in the metering chamber 130 such that the pressure which the source of propellant maintains on the top face of the piston now predominates and forces the piston through its complete discharge stroke through the metering chamber until the piston face abuts against the upper face of the stationary seal plate 121. This position of the parts is shown in FIG. 19. At this point the check valve will close as the pressure in the transmission line drops off to a predetermined critical value.

The return or charging stroke is initiated by the upward movement of the operating post which allows the return spring 138 to drive the valve stem 132 downwardly with respect to the cage to immediately seat the sealing disc 132D against the O-ring 136 for closing off the discharge passage at the entrance to the transmission line and the check valve. This sequence prevents a false opening of the check valve such as could result from a transient pressure build up in the transmission line if the propellant supply were to momentarily be connected in open communication with the discharge passage.

The cage spring 135 supports the cage in sealed relation against the valve seat 121S on the stationary seal plate until near the end of the up-stroke of the reciprocating post assembly. Upon opening of this seal propellant under pressure is again supplied through the port 121P to the underface of the piston to elevate it to the top of the metering cylinder and thus another charge is stored in the metering chamber.

Upon discharge of the container from the mounting niche the spring 114 retracts the slide block 111 to prevent propellant discharge in the event no container is supplied for the next down stroke of the reciprocating post assembly. In this situation, the full length vertical passage through the block accommodates the striker stem for the full travel of the posts and thus the discharge passage remains closed.

*Crimper head*

The crimper head, which is shown in FIGS. 21 to 26, is associated with a modified mounting bracket 105' for driving the head by means of the operating post 103 of the reciprocating post assembly 29 which is controlled by the lower cam track 34.

The crimper head 76 has a main cylinder sleeve 150 threaded internally at its opposite ends to receive an upper cylinder end casting 151 and a lower cylinder sleeve extension 152. The main cylinder sleeve is disposed in the mounting bracket 105' with a suitable bushing 153 provided between the sleeve and bracket to accommodate sliding movement of the cylinder sleeve through the bracket for developing a preloading force through a set of four springs 154 which telescope over a set of upstanding guide posts 155 that are fixed in the mounting bracket. The preload springs 154 are housed in retainer shells 156 that abut against the upper end of the guide posts and seat against a common preload ring 157 that abuts against the upper end of the main cylinder sleeve. A lock ring 158 holds the cylinder from falling out of the mounting bracket.

A free sliding piston 159 is disposed within the main cylinder sleeve 150 for actuation by hydraulic liquid pressure from the supply line 78 that is connected through a central lengthwise bore 151B in the cylinder end. The piston has an integral depending skirt 159S about its outer margin forming a guide pocket for a plunger assembly which is slidable axially through the head in response to the application of hydraulic pressure thereto.

The plunger assembly includes a main plunger element 160, a headed thrust sleeve 161 threaded on the exterior of the plunger element to encircle the upper end thereof, a carrier ring 162 seated in sealing relation within an annular pocket at the upper end of the sleeve extension 152, a plunger return spring 163 encircling the plunger and reacting between the thrust sleeve 161 and the carrier ring 162. The segmented collet 23 is confined within the sleeve extension and is disposed in encircling relation to the lower end of the plunger element 160. The jaws 23J of the collet are engageable about the I.D. of the closure cap for the container and upon downward movement of the plunger are spread outwardly to crimp the closure cap into sealed relation about the mouth of the container.

A container locating bell 164 is mounted for sliding movement about the exterior of the main cylinder sleeve and the sleeve extension and is fitted with a set of stop screws 164S adjacent its upper end that are engageable with an annular exterior abutment shoulder 152A at the upper end of the sleeve extension for holding the bell in position on the crimper head. A set of coil springs 165 are seated in spring pockets opening through the upper end of the bell and react against the mounting bracket to normally urge the bell downwardly relative to the main cylinder sleeve. Thus when the head unit is freely suspended, the lower end of the bell hangs substantially beneath the collet with the bell being yieldably maintained in this position by engagement of the stop screws 164S against the abutment shoulder 152A of the sleeve extension.

The bell 164 has an annular internal pocket intermediately of its length fitted with an axial assemblage of annular seal ring elements that seat against a central shell or annulus 166 which has a radial bore 166B fixed in registry with a radial bore 164B in the bell to form a passage for the vacuum line (see FIG. 22). A cap ring 167 is threaded into the bell to compress the seal rings 168 of the assemblage. This vacuum passage through the bell 164 and shell 166 is adapted to open into a series of radial ports or bores 152B provided in the extension sleeve to establish communication with the lower end of the head through annular clearance spaces that exist between the collet 23 and the extension sleeve.

The bell has another internal bore 164P (FIG. 23) adjacent its lower end forming an entrance passage for the propellant transmission line 140. The bore 164P opens into the head in a generally tangential direction to deliver propellant with a tangential swirling motion.

At its lower end, the bell is fitted with an internally contoured container engaging adaptor ring 169 which is threaded within the bell to mount an internal seal ring gasket 170 that establishes sealing engagement about the upper end of the container for confining the applied suction and/or the delivered propellant to the container. A stop sleeve 171 is threaded within the lower end of the extension sleeve element and a seal ring 172 is mounted between the lower ends of the extension sleeve element and the stop sleeve. The stop sleeve 171 is adapted to seat against the top of the closure cap rim and the seal ring 172 is adapted to engage about the outer periphery of the closure cap rim to block propellant against entry into the collet and piston region of the crimper head.

*Operating sequence for filling and sealing*

The operation of the crimper head may be understood in conjunction with the FIG. 9 layout of the cam track 34. At the beginning of a cycle of movement through the rotary link, the operating piston 159 of the crimper head is at its upper limit of travel and the bell 164 is suspended with its stop screws 164S in engagement with the abutment shoulder 152A on the exterior of the extension sleeve element. As a container moves into its mounting niche beneath the bell 164 of the crimper, the operating post 103 simultaneously begins to move downwardly to immediately seat the adaptor ring 169 upon the container. This makes full use of the time available in each cycle. With the bell suspended in its initial lowermost position, the vacuum passages 164B and 166B through the bell are sealed at a point on the extension sleeve element 152 that is located slightly below the port 152B provided in the sleeve extension.

An important feature of this arrangement resides in the fact that the vacuum passage remains closed if no container is presented for engagement by the bell. In the absence of a container, the bell and the entire crimper head mechanism move downwardly in unison with the bell in its freely suspended lowermost position where the port 166B is located below the ports 152B so that the vacuum port remains closed. Since the turntable processes a number of containers simultaneously it is important that the absence of a container will not result in dissipating the suction effect of the vacuum source as this would impair the processing of the other containers.

As the crimper head is brought down upon a properly positioned container, the hold down springs 165 in the bell are compressed to bias the bell against the container for loading the seal ring 170 sufficiently to create a leakproof seal about the upper end of the container. This phase of the operation is controlled by the cam track section labelled "infeed" in FIG. 9.

Continued downward movement of the operating post moves the main cylinder sleeve 150 downwardly through the bell until the vacuum port 152B in the sleeve extension is in registry with the vacuum passage 164B in the bell as shown in FIG. 21. This subjects the region at the top of the container to the vacuum for first elevating the cap and for thereafter vacuum purging air or other gaseous material in the container. This operation is shown in FIG. 8A and this phase of the operation is controlled by the cam track section labelled "vacuum" in FIG. 9. At this stage, the cap is not stripped onto the collet 23 to an extent sufficient to create a seal against the rubber seal ring 172 and this is important for maintaining the vacuum passage which extends upwardly between the collet 23 and the stop sleeve 171.

After dwelling at this "vacuum" level for a time sufficient to complete vacuum purging of the container, the operating post again moves downwardly to forceably strip the collet 23 into the cap preparatory to mechanically lifting the cap above the container. This phase is controlled by the section of the cam track labelled "cap pick up" in FIG. 9 and when the post is at its lower limit of travel, the cap is fully stripped onto the collet (FIG. 8B) and the O.D. of the cap rim has sealing engagement with the seal ring 172 which moves in unison with the collet at this stage of the cycle to the position shown in FIG. 24.

The operating post is then raised a short distance to elevate the cap above the container (FIGS. 8C and 25) and provide desired clearance beneath the cap for filling the propellant through its tangentially directed inlet port 164P and into the container. The tangent inlet port 164P at the terminus of the propellant entry passage develops a tangential swirl of propellant for avoiding turbulence in the entering stream of propellant and for avoiding impact charging of the propellant such as might lead to splashing of the product and contamination of the inside of the head and also of the exterior of the top of the container. During this pressure fill phase of the cycle, the seal between the seal ring element 172 and the rim of the closure cap blocks propellant against escape into the vacuum passages and the seal ring element has a pressure responsive self-sealing circumferential lip configuration 172L that increases in sealing effect in direct proportion to the pressure exerted upon it by the propellant.

The timing chart of FIG. 9 illustrates that the pressure filler head operates to supply propellant under pressure through the transmission line and its check valve 141 and into the crimper head during the interval when the crimper head completes the delivery passage by unlocking the tangential inlet port 164P in the lower end of the bell. The chart also indicates that after the pressure filling step is completed, the operating post for the crimper is again lowered to drive the collet down and seat the cap in the mouth of the container (FIGS. 8D and 26).

Simultaneously, the stop sleeve 171 seats on the rim of the cap for applying a preload force 154 from the preload springs at the upper end of the head mounting bracket 105'. The preload force is transmitted from the preload springs 154 through the spring seat thrust ring 157, through the main cylinder sleeve 159 and then through the extension sleeve element 152 and the stop sleeve 171. The preload force is developed by virtue of the over-travel motion of the mounting bracket 105' with respect to the main cylinder sleeve 150. This over-travel sets up the preloading compression of the springs.

The preload force upon the closure cap develops an initial flow of the usual flowed-in-gasket utilized at the underface of the closure cap rim for establishing a seal with the container. Practical experience has shown that these flowed-in-gaskets must be preloaded prior to the actual crimping of the cap if they are to effect a good seal. Preloading is less important where the product within the container is capable of causing swelling of the flowed-in-gasket but it is more important where only a material such as Freon is present since Freon is incapable of inducing this swelling action which is so important for ensuring the development of a good seal.

Figures 24, 25, 26:
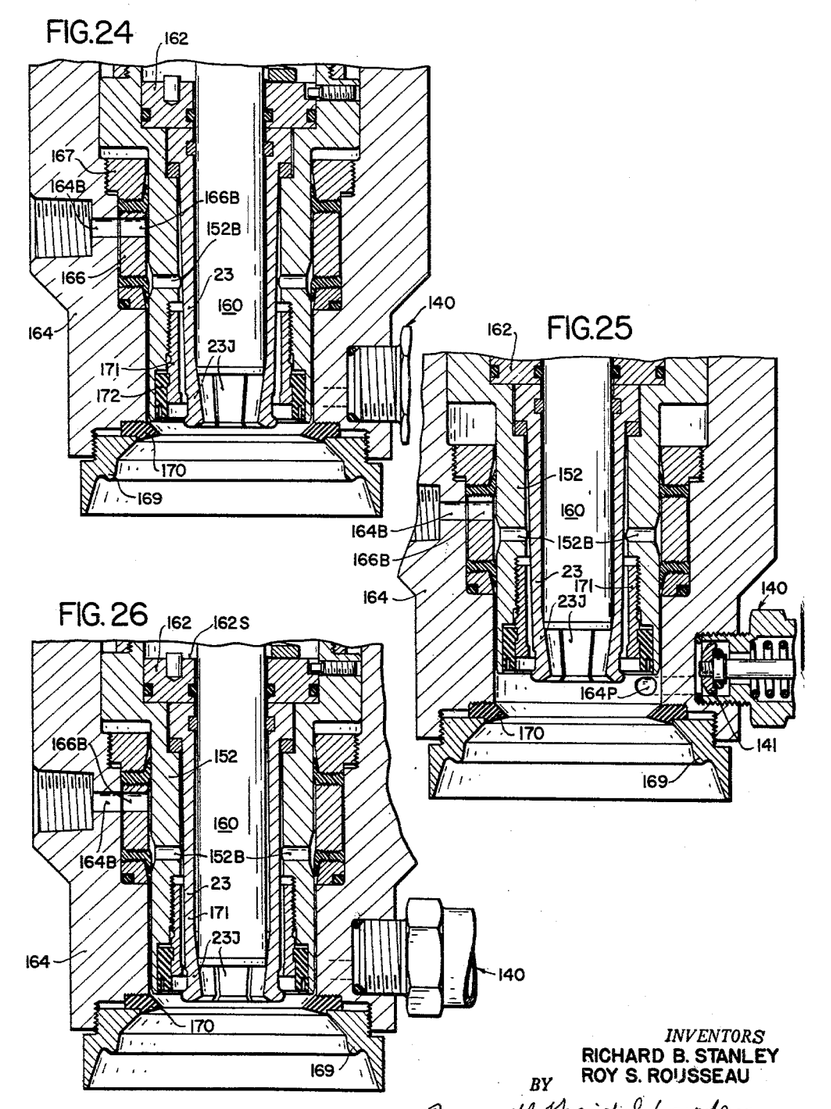
FIGS. 24, 25 and 26 are vertical sectional views through the lower end of a crimper head illustrating the parts thereof in the cap pickup, the pressure filler and the crimp positions, respectively.

When the cap is properly seated in the container under a preload force applied by the springs 154, the operating post dwells for a period labelled "crimping" in FIG. 9 during which hydraulic pressure is applied through the cylinder end 151 to the backface of the piston 159 to drive the piston downwardly and correspondingly to force the plunger 160 through the lower end of the collet 23 for spreading the collet jaws into crimping engagement with the cap rim (FIG. 26). This travel of the piston 159 and the plunger 160 is resisted by the plunger return spring 163 which becomes compressed to store up sufficient energy for returning the plunger. The hydraulic pressure is then removed in accordance with the timing sequence of the rotary seal arrangement and the return spring 163 expands to restore the plunger 160 to its initial position at the upper end of the main cylinder sleeve 150.

As soon as the operating post starts upward during the "outfeed" phase of the operating cycle, the bell springs 165 urge the bell 164 downwardly relative to the other parts of the crimper head to exert a force tending to strip the container free of the collet 23. After a short rise, sufficient to establish the vacuum passages 164B and 166B in registry with the vacuum port 152B (FIG. 21), the operating post dwells briefly as indicated at 34D on cam track 34 on the timing chart of FIG. 9. During this dwell period, the seal ring 170 within the locating adaptor ring 169 maintains its seal against the container wall to enable the vacuum line to evacuate any gas or other volatile fluids remaining in the region surrounding the top of the container or in the tangential propellant entry passage.

Finally, the operating rod returns to its initial position at the full upper limit of travel to lift the bell and adaptor free of the container for permitting discharge of the container from the dial plate 22P.

Crimper head adjustments

The crimper head 76 has a number of important features of adjustability which facilitate its adaptation to containers and closure caps of slightly different crimp depths and crimp diameters. Crimp depth may be defined as the distance between the bottom end of the stop sleeve 171 and the jaws 23J of the collet and this may be adjusted by rotating the stop sleeve 171 relative to the extension sleeve element 152. With the present construction, this may be accomplished without disassembly. Crimp diameter may be defined as the radial spacing of the collet jaws and is adjustable by regulating the length of the plunger stroke. The stroke of the plunger is limited by cooperating abutment surfaces 161S and 162S, respectively, on oppositely facing ends of the thrust sleeve 161 and the carrier ring 162. The initial distance between these surfaces may be regulated by rotating the plunger 160 with respect to the thrust sleeve 161 and for this purpose the plunger has a socket 160S (FIG. 21) opening through its lower end for convenient wrench engagement and the thrust sleeve 161 is fixed against rotation within the depending piston skirt. The cap pick-up diameter of the collet 23 may also be adjusted to achieve a proper fit for stripping the collet into the cap to initially lift the cap. This cap pick-up diameter is determined by the original position of the plunger and is adjusted by rotating the cylinder end 151 with respect to the main cylinder sleeve 150.

Cap pickup modification

In an alternative arrangement, the cap pickup function of the collet 23 may be controlled by supplying hydraulic pressure to the upper face of the piston 159 at the appropriate point in the movement of the container through the rotary link. The application of hydraulic pressure serves to move the plunger element 160 downwardly through the collet 23 to spread its jaws into secure mechanical engagement with the rim of the container cap. This action is to be distinguished from that previously described wherein the initial diameter of the collet jaws is such that these jaws are capable of creating a force fit with the rim of the cap.

To provide the equipment with this function, the rotary seal elements of FIG. 14 are arranged to provide an additional high pressure port indicated in phantom lines at 92′, the boundary wall portions of which are indicated by dotted lines at 92W′. The high pressure hydraulic supply line 82 would include a passage extension 82′ that communicates with the port 92′. Correspondingly, the drain passage 81 would have a drain passage extension 81′ communicating with the now isolated region of the large drain port. With this arrangement, it will be understood that high pressure is applied through port 92′ at the instant that the cap pickup function is to occur. Thus, the position of the port 92′ is correlated with the cam track 34 so that the cap pickup portion of the track controls the crimper's reciprocating post during the interval when the port 92′ is in communication with the corresponding hydraulic liquid supply line 78.

The foregoing description and the drawings are given merely to explain and illustrate the invention and the manner in which it may be performed, and the invention is not to be limited thereto except insofar as the appended claims are so limited, since those skilled in the art who have this disclosure before them will be able to make modifications and variations therein without departing from the scope and spirit of the invention.

What is claimed is:

1. In a container conveying arrangement wherein a container accelerating mechanism has a worm screw extending lengthwise alongside a conveyor surface, said screw having a container receiving helical groove for accelerating containers from a consolidated relationship at the entrance end of said screw to deliver containers individually and in predetermined timed relationship at the exit end of said screw, the improvement wherein an elongated shell having aligned bearings for rotatably receiving opposite ends of said screw supports said screw for rotation about an adjustment axis that extends alongside said conveyor surface, said shell having an endwise extending support journal, a bearing block rotatably receiving said journal to mount said shell for rotation about a drive axis parallel to and offset from said adjustment axis whereby rotational adjustment of said shell in said bearing shifts the position of said adjustment axis to provide a vernier timing adjustment of the container accelerating function of said worm screw, and means for rotating said worm about its adjustment axis.

2. In a container conveyor arrangement wherein a container accelerating mechanism has a worm screw extending lengthwise alongside a conveyor surface, said screw having a container receiving helical groove for accelerating containers from a consolidated relationship at the entrance end of said screw to deliver containers individually and in predetermined timed relationship at the exit end of said screw, the improvement wherein an elongated shell having aligned bearings for rotatably receiving opposite ends of said screw supports said screw for rotation about an adjustment axis that extends alongside said conveyor surface, said shell having an endwise extending support journal, a bearing block rotatably receiving said journal to mount said shell for rotation about a drive axis parallel to and offset from said adjustment axis whereby rotational adjustment of said shell in said bearing shifts the position of said adjustment axis to provide a vernier timing adjustment of the container accelerating function of said worm screw, said shell having a lengthwise bore aligned with said adjustment axis, a pinion gear, a drive rod extending through said bore and connecting said pinion gear to said screw, and a hollow drive gear mounted for rotation about said drive axis and having gear teeth encircling and engaging said pinion gear about a planetary path through which said pinion gear is movable.

3. An adjustable mounting and driving mechanism for an article feeding worm screw comprising an elongated shell having aligned bearings supporting opposite ends of the screw for rotation on an adjustment axis, means for mounting said shell for rotational adjustment about a drive axis parallel to and offset from said adjustment axis to provide a vernier timing adjustment of the article feeding function of the screw, and driving means for said screw and including a pinion gear for driving connection to the screw to rotate about the adjustment axis of the screw at any of its positions of adjustment and a drive gear rotatable about the drive axis and having gear teeth movable along the path through which the pinion gear is adjustable and drivingly engageable with the pinion gear.

References Cited by the Examiner

UNITED STATES PATENTS

| | | | |
|---|---|---|---|
| 1,258,623 | 3/18 | Stake. | |
| 1,983,252 | 12/34 | Troyer | 198—22 X |
| 2,300,298 | 10/42 | Lippold | 198—22 |
| 2,365,304 | 12/44 | Stewart | 198—22 |
| 2,385,882 | 10/45 | Rolker | 198—22 X |
| 2,618,425 | 11/52 | Stover | 198—22 X |
| 2,768,656 | 10/56 | Day. | |
| 2,781,122 | 2/57 | Gueffroy | 198—34 |
| 2,845,761 | 8/58 | Bagarozy | 53—88 |
| 2,890,787 | 6/59 | Carter | 198—34 |
| 2,947,126 | 8/60 | Focht | 53—88 |

FOREIGN PATENTS 890,026   9/53   Germany.

SAMUEL F. COLEMAN, *Acting Primary Examiner.*

ROBERT A. LEIGHEY, EDWARD A. SROKA, ERNEST A. FALLER, JR., WILLIAM B. LA BORDE,
*Examiners.*